UNITED STATES PATENT OFFICE.

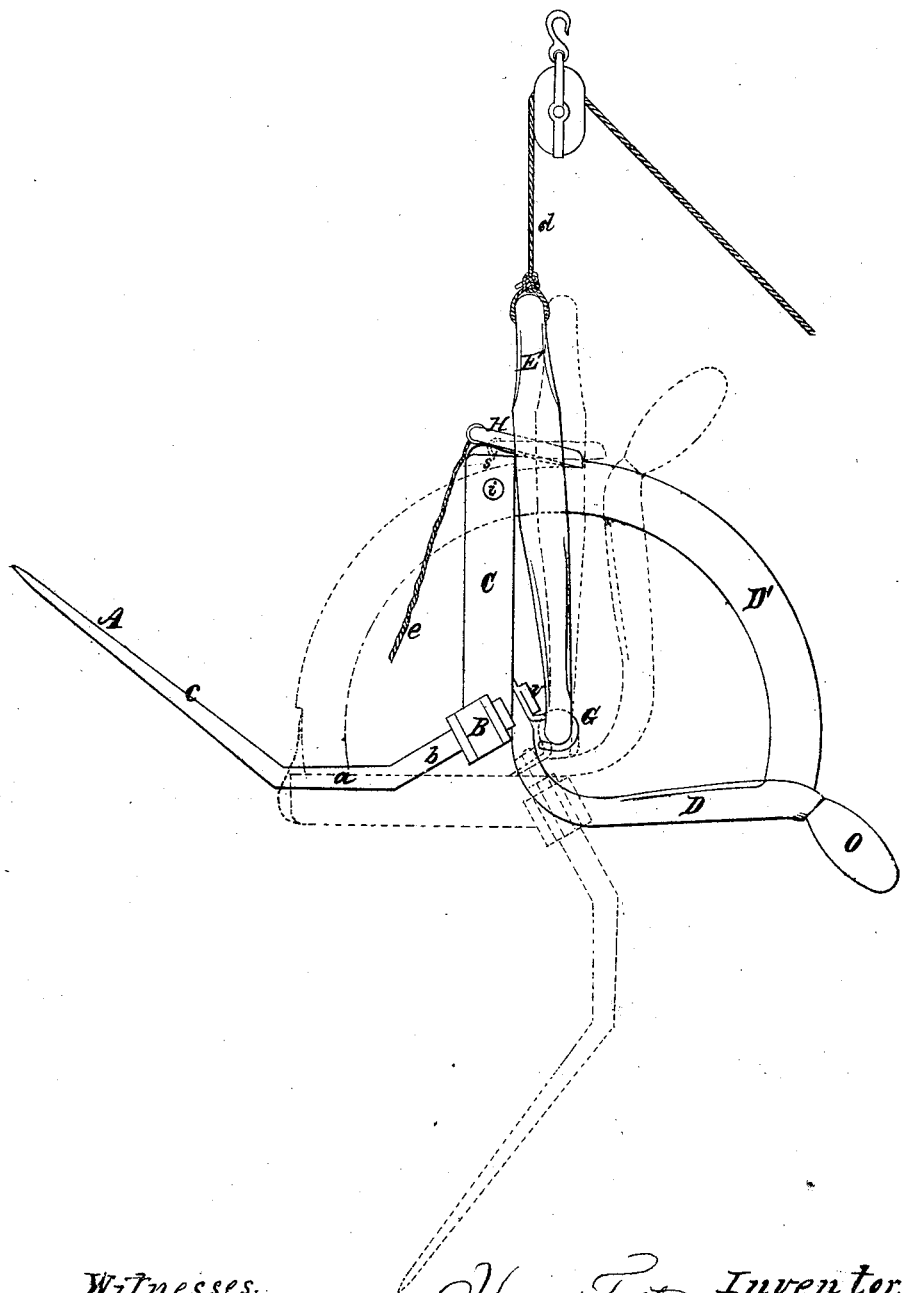

HENRY TOTTEN, OF LEESVILLE, OHIO.

IMPROVEMENT IN HORSE HAY-FORKS.

Specification forming part of Letters Patent No. 50,516, dated October 17, 1865.

*To all whom it may concern:*

Be it known that I, HENRY TOTTEN, of Leesville, Carroll county, in the State of Ohio, have invented certain new and useful Improvements in Elevating Horse Hay-Forks; and I do hereby declare that the following is a full and exact description thereof, reference being had to the accompanying drawing, and to the letters of reference thereon marked.

The drawing is simply a side elevation of the fork, the red lines showing its position in discharging the hay or manure.

In constructing my improved fork I first form three or more steel tines, $a$, of the form shown in the drawing. It will be noticed that when the fork is in its loaded position the central part, $a$, (about one-fourth the length of the tine,) is nearly horizontal; the rear or butt end, $b$, of the fork (about one-fourth of the tine) is bent up at an obtuse angle with part $a$ of about one hundred and twenty-five or one hundred and thirty degrees; and that the front end, $c$, of the tine (about the other half of the tine) is bent up from the front end of the central part at about the same angle, but in the opposite direction.

B is a wrought-iron bar of a length to suit the number of tines or size of the fork. In its center, and of about half its length, is a wrought-iron standard, C, made with a shoulder to fit to bar B, so that the standard C shall be nearly vertical when the fork is suspended.

D D' are two curved pieces of wrought-iron, forming the quadrant brace or handle; O, the wooden handle on the end of piece D.

E is the swivel-bar playing on the hook G, and having the elevating-cord $d$ fast to a ring in its upper end. H is the dog which sets the fork. It is pivoted to swivel-bar E and catches in an indentation in quadrant-brace D'. It is made to catch or set by means of spring S, riveted to upper edge of bar D'. A cord, $e$, depends from the outer end of dog H, to detach its hold and allow the fork to discharge its load.

In putting the parts of my improved fork together all of the tines except the central one have a simple square shoulder formed on a portion of their butt-ends, and these ends are simply put through square mortises in the bar B and secured by nuts $v$. The central tine, however, has a longer shoulder, but otherwise similar, and passes not only through a square mortise in bar B, but also through similar mortises in bar C and brace D, and through hook G. The nut $v$ is then drawn close, thus holding all these parts together simply and firmly. A pin, $i$, secures the upper ends of bars C and D' together.

The operation of my fork is similar to that of implements of the class to which it belongs, and does not require other description than to refer to the drawing, which illustrates its loaded and unloaded positions.

By my improved construction of tine I am enabled to load the fork and unload it with greater ease and to discharge the hay or manure with more rapidity and less exertion of power than by other forks. Its exceedingly simple and strong construction precludes its becoming unfit for service by hard usage.

Having thus fully described my invention, what I claim as new, and desire to secure by Letters Patent, is—

1. The tines A, constructed substantially as described, so that the parts $a$, $b$, and $c$ shall lie in planes of different angles.

2. The construction and arrangement of the bar B, standard C, quadrant-brace D D', and swivel-bar E, substantially as described.

3. The construction and arrangement of the quadrant-brace D D', swivel-bar E, hook G, and dog H, operating substantially as described.

In testimony that I claim the above I hereunto affix my signature this 31st day of July, 1865.

HENRY TOTTEN.

In presence of—
SAMUEL W. PRIPPETT,
J. T. PRICE.